DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900 O.G. 1233

T900,026
SUSPENSIONS

Thomas M. Jones, 208 Stephenson Court, Sheffield, Ala. 35660

Continuation-in-part of application Ser. No. 741,099, June 28, 1968. This application June 21, 1971, Ser. No. 154,772
**Int. Cl. C05b *7/00***
U.S. Cl. 71—34
1 Sheet Drawing. 57 Pages Specification

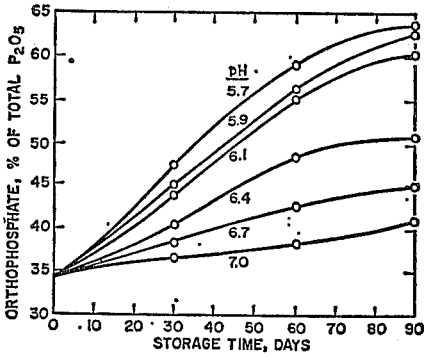

AMMONIUM POLYPHOSPHATE SALT SUSPENSION FERTILIZER
EFFECT OF pH ON HYDROLYSIS OF POLYPHOSPHATES TO ORTHOPHOSPHATE DURING STORAGE AT 100°F.

Ammonium polyphosphate fertilizers are limited in grade and only short-term storage is feasible because crystals grow to large sizes during storage and high viscosities develop. High viscosities decrease the ability of the suspensions to flow. Large crystals settle and plug up valves and spray nozzles. Either large crystals or high viscosity makes transfer through pipe line and disbursement to the soil difficult. Crystal growth and increase in viscosity during storage were retarded by control of acid concentration (polyphosphate level), product concentration, and pH to produce an abundance of small seed crystals that remain as the equilibrium phase despite hydrolysis of polyphosphate. With acid of 76 to 78 percent $P_2O_5$ content, ammoniation to pH 5.0 to 5.4 resulted in monoammonium phosphate ($NH_4H_2PO_4$) as the equilibrium phase. Ammoniation to pH 6.3 to 7.0 resulted in a diammonium phopshate [$(NH_4)_2HPO_4$] as the equilibrium phase. Typical products were 11–45–0 (pH 5.2) or 13–41–0 and 14–44–0 (pH 6.4). Higher acid concentrations or ammoniation in the pH range 5.6 to 6.0 resulted in unstable crystal phases. Satisfactory high-grade, three-component suspensions with good storage properties may also be produced by this procedure.

SUSPENSIONS
Filed June 21, 1971
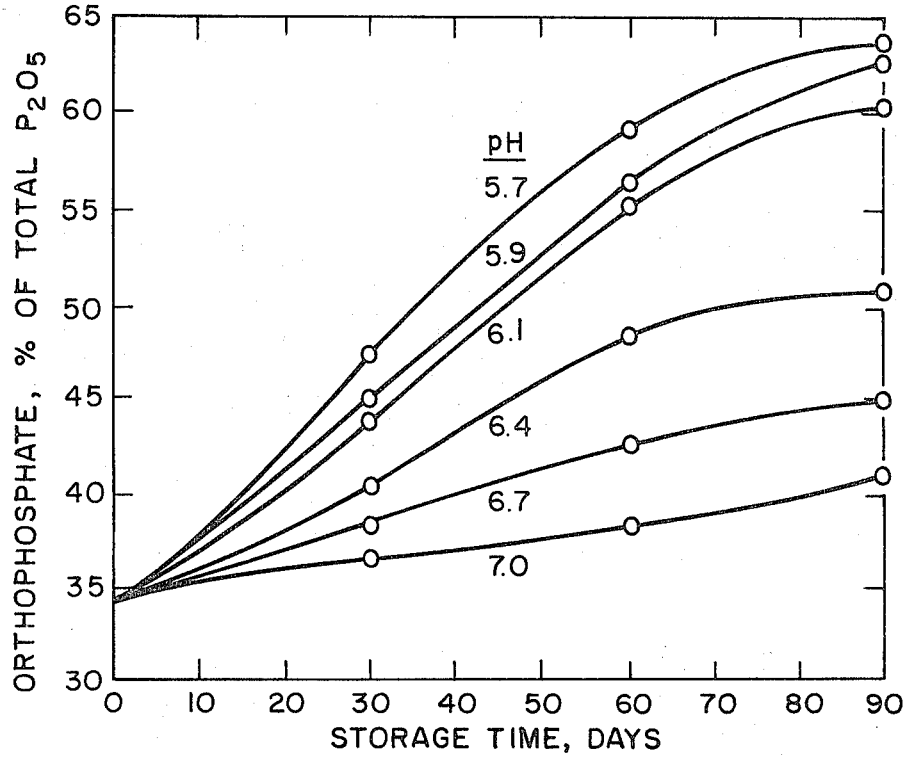
AMMONIUM POLYPHOSPHATE SALT SUSPENSION FERTILIZER
EFFECT OF pH ON HYDROLYSIS OF POLYPHOSPHATES TO ORTHOPHOSPHATE DURING STORAGE AT 100° F.
Thomas M. Jones INVENTOR
BY Robert A. Petrusek Agt